(12) United States Patent
Kelnhofer

(10) Patent No.: US 9,382,009 B2
(45) Date of Patent: Jul. 5, 2016

(54) RELIEF VALVE FOR BEING ARRANGED ON AN OPENING OF A FUSELAGE SHELL OF AN AIRCRAFT, FUSELAGE PART WITH SUCH A RELIEF VALVE AND AIRCRAFT FUSELAGE

(71) Applicant: Airbus Operations GmbH, Hamburg (DE)

(72) Inventor: Juergen Kelnhofer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 276 days.

(21) Appl. No.: 14/259,753

(22) Filed: Apr. 23, 2014

(65) Prior Publication Data

US 2014/0227957 A1 Aug. 14, 2014

Related U.S. Application Data

(62) Division of application No. 12/456,466, filed on Jun. 17, 2009, now abandoned.

(60) Provisional application No. 61/073,258, filed on Jun. 17, 2008.

(30) Foreign Application Priority Data

Jun. 17, 2008 (DE) .................... 10 2008 028 799

(51) Int. Cl.
*B64D 13/04* (2006.01)
*B64C 1/18* (2006.01)

(52) U.S. Cl.
CPC .. *B64D 13/04* (2013.01); *B64C 1/18* (2013.01)

(58) Field of Classification Search
CPC ........ B64D 13/04; B64D 33/02; B64D 13/02; B64D 2033/0226; B64C 2230/06; B64C 2230/20; B64C 23/00; B64C 1/18
See application file for complete search history.

(56) References Cited

U.S. PATENT DOCUMENTS

| 2,362,552 A | 11/1944 | Heymann |
| 2,387,708 A | 10/1945 | Arnhym |
| 3,740,006 A | 6/1973 | Maher |
| 4,174,083 A | 11/1979 | Mohn |
| 4,418,879 A | 12/1983 | Vanderleest |
| 6,050,527 A | 4/2000 | Hebert et al. |

FOREIGN PATENT DOCUMENTS

| EP | 1 895 212 A1 | 3/2008 |
| WO | 2005/016748 A2 | 2/2005 |
| WO | 2008/142289 A2 | 11/2008 |

OTHER PUBLICATIONS

German Office Action in 10 2008 028 799.7 dated Aug. 8, 2013, with an English translation of relevant parts.

*Primary Examiner* — Valentina Xavier
(74) *Attorney, Agent, or Firm* — Collard & Roe, P.C.

(57) ABSTRACT

The invention pertains to a relief valve (10) for being arranged on an opening (10) of a fuselage shell of an aircraft, wherein the opening (10) has a front opening edge (9a) and a rear opening edge (9a), and wherein the relief valve (10) features: a cover (13) that is arranged on the fuselage shell by means of an opening and closing device in order to open and close the opening (10) of the fuselage shell, and a prestressing device for prestressing the cover (13) into an initial position, wherein a guide plate (23) is arranged on the cover (13) by means of a mounting device (20), wherein the guide plate is spaced apart from the cover (13) and extends along the cover (13), and wherein the invention furthermore pertains to a fuselage part with such a relief valve (10) for being installed into an aircraft fuselage with a fuselage shell and a plurality of fuselage frames arranged on the inside of the fuselage shell, as well as to an aircraft fuselage with such a fuselage part.

7 Claims, 6 Drawing Sheets

RELIEF VALVE FOR BEING ARRANGED ON AN OPENING OF A FUSELAGE SHELL OF AN AIRCRAFT, FUSELAGE PART WITH SUCH A RELIEF VALVE AND AIRCRAFT FUSELAGE

CROSS REFERENCE TO RELATED APPLICATIONS

This application is a divisional of and Applicant claims priority under 35 U.S.C. §§120 and 121 of U.S. patent application Ser. No. 12/456,466 filed on Jun. 17, 2009, which claims priority under 35 U.S.C. §119(e) from U.S. Provisional Patent Application Ser. No. 61/073,258 filed on Jun. 17, 2008 and under 35 U.S.C. §119 from German Application No. 10 2008 028 799.7 filed on Jun. 17, 2008, the disclosures of each of which are hereby incorporated by reference. A certified copy of priority German Patent Application No. 10 2008 028 799.7 is contained in parent U.S. patent application Ser. No. 12/456,466.

BACKGROUND OF THE INVENTION

1. Field of the Invention

The invention pertains to a relief valve for being arranged on an opening of a fuselage shell of an aircraft, to a fuselage part with such a relief valve for being installed into an aircraft fuselage with a fuselage shell and a plurality of fuselage frames arranged on the inside of the fuselage shell, and to an aircraft fuselage with such a fuselage part.

2. Description of the Related Art

From U.S. Pat. No. 4,174,083 a device for influencing the air flow on a cover of a fuselage is known for increasing the supply of ram air in a climate system.

The general state of the art includes relief valves or "negative relief valves" (Negative Relief Valves) for being arranged on an opening of a fuselage shell of an aircraft that serves for producing a fuselage part or an aircraft fuselage. One such relief valve is intended for being installed into an aircraft fuselage with a fuselage shell and a plurality of fuselage frames arranged on the inside of the fuselage shell, wherein this relief valve is integrated into the aircraft system and forms part of a cabin pressure control system (Cabin Pressure Control System) for compensating a negative cabin pressure relative to the external pressure on the skin of the fuselage while the aircraft is in flight. The installation site of the relief valve depends on the type of aircraft and, among other things, external constraints such as, for example, the float line of the aircraft and the accessibility. In most known applications, these valves are installed into the skin of the aircraft in the front fuselage section. In case of a negative cabin pressure (relative to the external pressure), these valves open and allow a pressure compensation between the cabin and the surroundings due to the mass flow through the valve.

Relief valves of this type, one embodiment of which is illustrated in FIGS. 1 to 4 and identified by the reference symbol 10', are arranged on a fuselage part 1' with a shell part 3'. A plurality of fuselage frames 7a', 7b', 7c', 7d' extending in or along the circumferential direction of the aircraft fuselage is arranged on the inside of the shell part 3'. FIG. 1 shows the inside of the shell part 3' with sections of the fuselage frames 7a', 7b', 7c', 7d'. The shell part 3' features an opening 9' that is covered by a cover 13' of the relief valve 10', wherein this cover is coupled to the shell part 3' by means of a hinge joint 11' such that the cover 13' can be closed or opened. The hinge joint 11' is situated on the side of the opening 13' that faces the flow S flowing around the fuselage part 1' installed into an aircraft fuselage in the flow direction S, i.e., on the front edge referred to the longitudinal aircraft axis X or the longitudinal direction X1 of the feel of part 1'. The cover 13' is prestressed into the closed position (FIG. 2) against a stopping device 15' by means of a prestressing device. In FIGS. 2 and 3, the prestressing force exerted by the prestressing device is indicated with an arrow and the reference symbol "F" referring thereto. The relief valve 10' is illustrated in an opened position in FIG. 3. In the opened position of the relief valve 10', part of the flow flowing around the fuselage part 1' in the flow direction S reaches the interior of the aircraft fuselage, into which the fuselage part is integrated. This means that the relief valve 10' known from the general state of the art opens when the pressure on the outside of the fuselage that is subjected to a flow S lies above the pressure on the inside of the relief valve 10' by a certain amount such that a pressure compensation takes place in the interior of the fuselage as intended in these situations.

Although the relief valve 10' known from the general state of the art has a simple construction, the pressure compensation does not always take place sufficiently fast.

SUMMARY OF THE INVENTION

The invention is based on the objective of making available a relief valve for being arranged on an opening of a pressurized fuselage part of an aircraft for compensating a negative pressure within the pressurized fuselage part in relation to the atmospheric conditions in the outside area of the aircraft and a pressurized fuselage part with such a relief valve that respectively make it possible to achieve the compensation of a pressure drop within the pressurized fuselage part with very high functional safety, wherein an optimum mass flow from the outside to the inside of the fuselage shell or the aircraft fuselage, respectively, a small installation size and a very high reliability shall be achieved.

This objective is attained with a relief valve in accordance with the invention. Other embodiments are discussed below.

The invention proposes a pressure compensating valve or a relief valve for being arranged on an opening of a pressurized fuselage part or a pressurized fuselage shell of an aircraft, wherein the opening has a front opening edge and a rear opening edge, and wherein the relief valve features: a cover that is arranged on the fuselage shell by means of an opening and closing device in order to open and close the opening of the fuselage shell, and a prestressing device for prestressing the cover into an initial position in which the cover preferably closes the opening. According to the invention, it is proposed, in particular, that a guide plate is arranged on the cover by means of a mounting device or support device, wherein said guide plate is spaced apart from the cover and extends along the cover, and wherein the support device is realized permeable to the flow in the direction, in which the air flows around the shell part or the relief valve, respectively, in its installed state. In this case, the support device may be realized in the form of at least one connecting plate that extends in the longitudinal aircraft axis and is arranged between the cover and the guide plate so as to connect the cover and the guide plate, or in the form of at least one rod or in a different fashion. The opening and closing device can be realized in different ways. For example, the cover for opening and closing the opening of the fuselage shell may be coupled to the fuselage shell by means of a guiding device or connected to the fuselage shell by means of a hinge joint. The hinge joint is preferably arranged on the side of the opening of the shell part or the relief valve that faces the intended flow when it is installed in a fuselage part.

In this case, the support device may consist of at least two rods that connect the cover and the guide plate and are arranged behind one another in the direction extending from the cover edge with the hinge joint to the cover edge situated opposite thereof. It would be possible, in particular, to couple each of the rods in an articulated fashion to the cover on the end on the cover side and to the guide plate on the end on the guide plate side such that the distance between the guide plate and the cover can be adjusted by rotating the rods. In these embodiments, in particular, it would furthermore be possible to prestress the rods into an initial position, in which the cover and the guide plate are spaced apart from one another by the smallest distance within the adjusting range. In this state the valve including a guide plate according to the invention produces relatively small aerodynamic resistance. Further, the guide plate increases the functional reliability of the valve with regard to the opening movement of the same. The adjusting range is the range that the distance between the cover and the guide plate can amount to during an adjustment or rotation of the rods. If the pressure within the pressurized fuselage part drops under a predetermined value with regard to the outer atmospheric pressure, the cover moves into the fuselage part or into an opening of the same in an opened position and due to the aerodynamic forces the guide plate moves away from the cover. Thereby the opening movement and the opening state of the cover is supported.

The invention furthermore proposes a pressurized fuselage part for being installed in an aircraft fuselage with a fuselage shell and a plurality of fuselage frames arranged on the inside of the fuselage shell, wherein the fuselage part has a longitudinal direction that extends in the direction of the longitudinal aircraft axis when it is installed in an aircraft fuselage and features an opening that is situated between two fuselage frames, as well as a relief valve. The relief valve specifically features: a cover that is arranged on the fuselage shell by means of an opening and closing device in order to open and close the opening of the fuselage shell, a prestressing device for prestressing the cover in the direction toward the outside of the fuselage shell, and a stopping device that is arranged in such a way that the cover can be moved against the force of the prestressing device from an initial position, in which it covers the opening, into a position, in which it opens the opening, due to a force of pressure that is directed from the outside toward the inside. The guide plate that is spaced apart from and extends along the cover in the longitudinal aircraft axis is arranged on the cover by means of the support device, wherein the support device is realized permeable to the flow in the longitudinal direction of the fuselage part.

In a normal state, i.e. during flight, the pressure within the fuselage part like the cabin area having the opening and the valve according to the invention is higher than the pressure in the atmosphere around the aircraft. The valve according to the invention is designed such that, in the case that the pressure within the fuselage part falls such that the inner pressure of the fuselage part lies more than a predetermined value below the atmospheric pressure, the valve moves into its opened position with high functional reliability in order to reduce the pressure drop within the fuselage part or in order to at least maintain a relatively low pressure within the fuselage part. The value of the difference between the inner pressure of the fuselage part and the pressure of the atmosphere, at which the valve shall move into its opened position lies, depending on the type of the respective aircraft, normally between 20 mbar and 60 mbar.

In a fuselage part with a front edge and a rear edge referred to its longitudinal direction and with an opening that has a front opening edge and a rear opening edge referred to the longitudinal aircraft axis, the cover for opening and closing the opening may be coupled to the fuselage shell by means of a hinge joint with a hinge axis that extends along the front opening edge.

The invention proposes, in particular, a pressure relief valve or a pressure compensating valve for being arranged on an opening of a pressurized fuselage part or a fuselage shell of an aircraft, wherein the opening has a front opening edge and a rear opening edge, and wherein the relief valve features:
  a cover that is coupled to the fuselage shell by means of a hinge joint with a hinge axis that extends along the front opening edge in order to open and close the opening,
  a pre-stressing device for pre-stressing the cover into an initial position,
  a pre-stressing device for pre-stressing the cover into an initial position,
  a guide plate being arranged on the cover by means of a support device, wherein said guide plate is spaced apart from the cover and extends along the cover, and wherein the support device is realized permeable in a main direction extending from the cover edge with the hinge joint to the cover edge situated opposite thereof.

According to the invention, the cover and the guide plate are formed such that the distance between the cover and the guide plate decreases along the main direction so that the air flowing between the cover and the guide plate is accelerated along the main direction and a resulting negative pressure is generated acting in the opening direction of the cover.

The cross-section of the guide plate which is running along the main direction can have a profile form which has a decreasing cross-section in a section of the guide plate along the main direction.

According to another example of the invention, the support device comprises at least one support rod that extends between the cover and the guide plate so as to connect the cover and the guide plate. In this regard, the support device can comprise at least one front support rod and at least one rear support rod with regard to the main direction. Further, the front support rod can particularly be mounted on a rotating part of the hinge joint. An advantage of this embodiment is that the hinge moment for rotating the respective rod can be decreased for safe upward movement of the guide plate.

In addition to one of the examples of the invention, the surface of the front support rod which is facing the main direction or which is directed against the main direction can be inclined in the direction of the main direction in order to support the opening of the cover by the airflow.

According to another aspect of the invention, a relief valve for being arranged on an opening of a pressurized fuselage part or a pressurized fuselage shell of an aircraft is provided, wherein the opening has a front opening edge and a rear opening edge, and wherein the relief valve further features:
  a cover that is arranged on the fuselage shell by means of a hinge joint in order to open and close the opening of the fuselage shell, and
  a prestressing device for prestressing the cover into an initial position,
  a guide plate being arranged on the cover by means of a support device, wherein said guide plate is spaced apart from the cover and extends along the cover, and wherein the support device is realized permeable in a main direction (H) extending from the cover edge with the hinge joint to the cover edge situated opposite thereof.

The support device comprises at least one front support rod and at least one rear support rod with regard to the main direction wherein the front support rod is mounted on a rotating part of the hinge joint, wherein each of the support rods is coupled in an articulated fashion to the cover e.g. on the end on the cover side and to the guide plate e.g. on the end on the guide plate side such that the distance between the guide plate and the cover can be adjusted by rotating the rods. Further, the support rods are pre-stressed into an initial position, in which the cover and the guide plate have the smallest distance within the adjustable distance range. Further, the cover the prestressing of the support rods is adjusted such that in the state in which the guide plate is blown by the air in the main direction, during an initial opening movement of the cover, the cover is moved in an open position while the distance between the guide plate and the cover increases.

According to an example of the invention, the cover and the guide plate are formed such that the distance between the cover and the guide plate decreases along the main direction so that the air flowing between the cover and the guide plate is accelerated along the main direction and a resulting negative pressure is generated acting in the opening direction of the cover.

According to another example of the invention, the cross-section of the guide plate running along the main direction has a profile form which is decreasing in a section of the guide plate along the main direction.

According to another aspect of the invention, a pressurized fuselage part of an aircraft fuselage is provided, wherein said fuselage part has a longitudinal direction that extends in the direction of the longitudinal aircraft axis when it is installed into an aircraft fuselage and features an opening that is arranged between two fuselage frames, as well as a relief valve device with a relief valve according to one of the embodiments of the invention, wherein the rotational axis of the hinge joint is running across the Longitudinal aircraft axis. The invention furthermore proposes an aircraft fuselage with a fuselage part that is realized in accordance with the aforementioned embodiment and features a relief valve or several relief valves according to one of the described embodiments.

The inventive relief valve can be used on or in the region of a ram air intake flap or another intake flap. In this case, the region may consist of a region of the fuselage that is covered by such a flap when it is closed.

BRIEF DESCRIPTION OF THE DRAWINGS

In addition to the general state of the art illustrated in FIGS. 1 to 4, embodiments of the invention are described below with reference to FIGS. 5 to 9. In these figures.

DETAILED DESCRIPTION OF PREFERRED EMBODIMENTS

Figure 1:
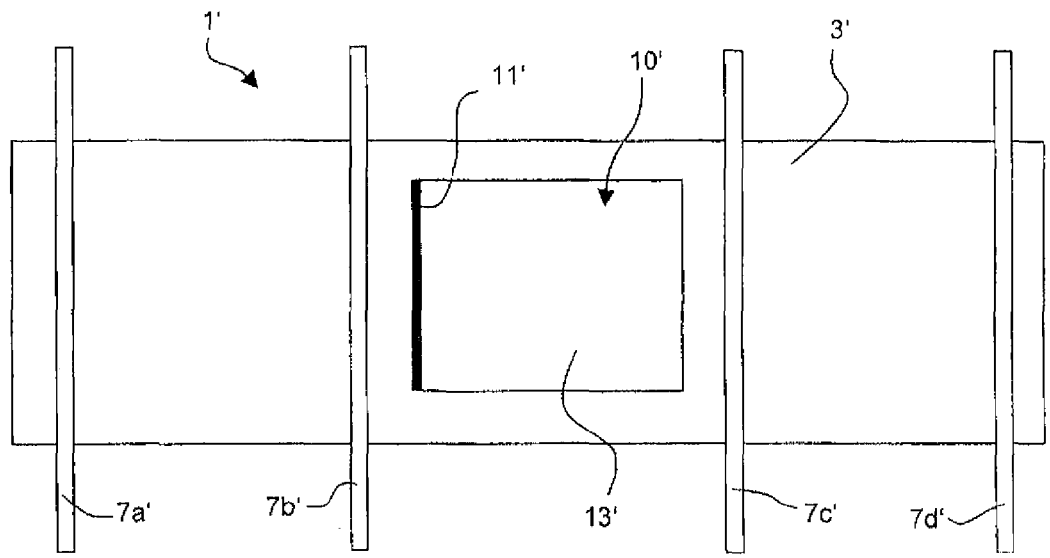
FIG. 1 shows a top view of a fuselage part for an aircraft viewed from the interior of the aircraft fuselage, with a fuselage shell that features an opening and a relief valve according to the state of the art that is arranged on said opening and illustrated in its closed position.
Figure 2:
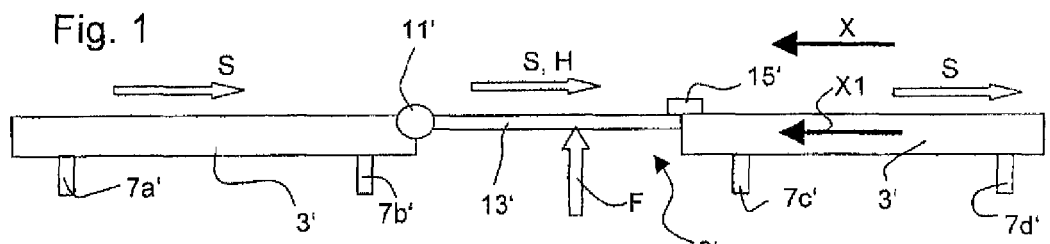
FIG. 2 shows a section of the fuselage part according to FIG. 1 viewed in the circumferential direction thereof, wherein the relief valve is illustrated in a closed position.
Figure 3:
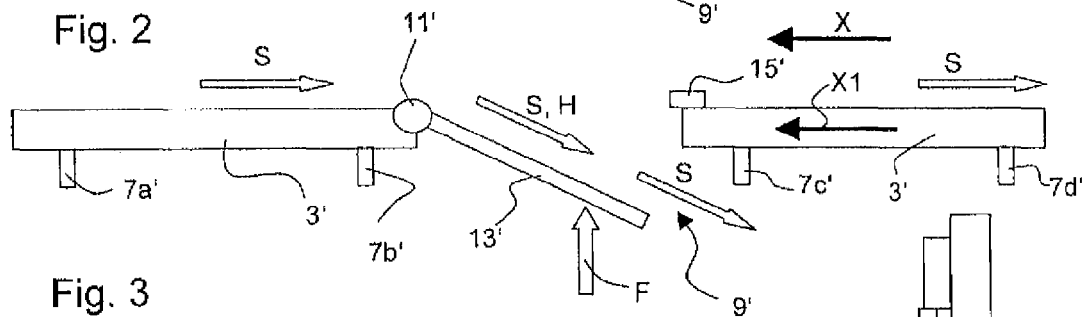
FIG. 3 shows a section through the fuselage part according to FIG. 2 with the relief valve illustrated in an opened position.
Figure 4:
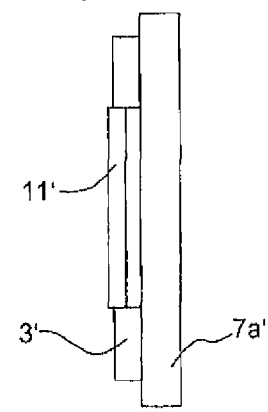
FIG. 4 shows a section of the fuselage part illustrated in FIGS. 1 to 3 viewed in the direction of the longitudinal aircraft axis, wherein the relief valve is illustrated in a closed position.
Figure 5:
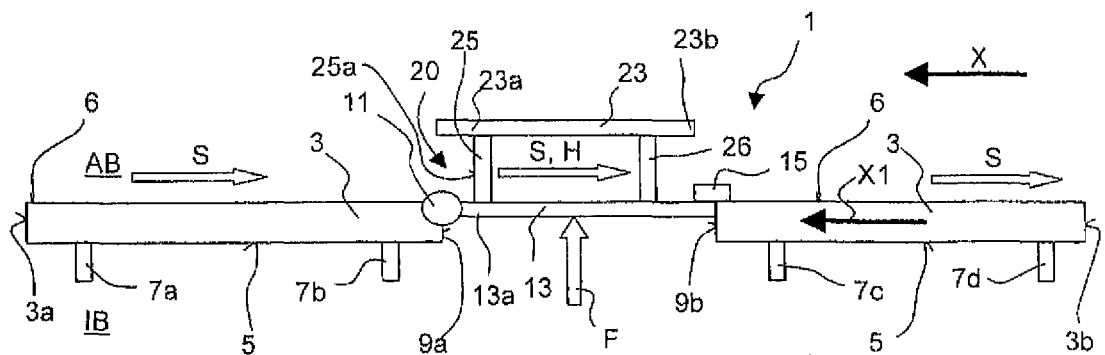
FIG. 5 shows a section of the fuselage part viewed in its circumferential direction, wherein the fuselage part features a fuselage shell with an opening and an embodiment of the inventive relief valve arranged on the opening, and wherein the relief valve is illustrated in a closed position.

FIG. 5 shows an embodiment of the inventive fuselage part 1 with a shell part 3 that, with respect to an installation of the fuselage part into an aircraft fuselage, has an inside 5 and an outside 6 that respectively face an inner region IB and an outer region AB of the aircraft fuselage. A plurality of fuselage frames 7a, 7b, 7c, 7d extending in or along the circumferential direction of the aircraft fuselage is arranged on the inside 5 of the shell part 3. The shell part 3 features an opening 9 that can be closed or opened with a relief valve 10. The relief valve 10 is illustrated in a closed position in FIG. 5, wherein the relief valve 10 is illustrated in an opened position in FIG. 6.

The longitudinal aircraft axis X extending from the rear end to the front end of the aircraft is illustrated in FIGS. 2, 3, 5, 6, 8, 9 for orientation purposes. Furthermore, FIGS. 2, 3, 5, 6, 8, 9 show the resulting flow direction S of the air flowing around the fuselage part 1 when it is installed in an aircraft fuselage of an aircraft and the aircraft is in flight as intended. Accordingly, the fuselage part 1 has a longitudinal direction X1 that extends in the direction of the longitudinal aircraft axis X when it is installed in an aircraft fuselage, as well as a front edge 3a and a rear edge 3b referred to the longitudinal aircraft axis X or the longitudinal direction X1 of the fuselage part, respectively. The shell part 3 features an opening 9 with an opening edge that encircles this opening and, referred to the longitudinal aircraft axis X, has a front opening edge 9*a* and a rear opening edge 9*b* that lies opposite of the front opening edge 9*a*. The opening may be shaped in different ways, e.g., rectangular and generally polygonal, round or elliptical.

In order to occasionally cover or open the opening 9, i.e., in order to cover or open the opening in dependence on a differential pressure, a cover 13 or a covering device is arranged on the shell part and can be moved from a closed into an open position and vice versa by means of an opening and closing device. In this case, a prestressing device is furthermore provided in order to prestress the cover into an initial position.

The opening and closing device may be realized in different ways. For example, the opening and closing device for opening and closing the opening of the fuselage shell may be coupled to the fuselage shell by means of a guiding device or connected to the fuselage shell by means of a hinge joint.

In the not-shown variation of the opening and closing device in the form of a guiding device, this guiding device may feature one or more guide rails that extend transverse to the longitudinal direction of the opening or transverse to the longitudinal direction X1 of the fuselage part 1, i.e., perpendicular or essentially perpendicular to the longitudinal direction of the fuselage surface, wherein guide parts arranged on the cover engage into said guide rails such that the cover does not or not only carry out a pivoting movement when it is opened and closed, but only or also a translational movement. The prestress can be realized with at least one spring that acts upon the cover 13 from the inner region IB or with a plurality of springs that act upon the cover 13 from the inner region IB. On their end that lies opposite of the end on the cover side, the springs are supported in a corresponding supporting device or holder.

In the variation of the opening and closing device in the form of a hinge joint that is illustrated in FIGS. 5 to 9 and described below, an edge section 13*a* of a cover 13 of the relief valve 10 is coupled to the fuselage part by means of a hinge joint 11 that is arranged on a section of the front opening edge 9*a*. The hinge joint is preferably provided on the side of the opening of the shell part or the relief valve that faces the intended flow in the installed state thereof in a fuselage part. The hinge axis 12 of the hinge joint 11 furthermore extends along the front opening edge 9*a* of the opening 9 and therefore transverse to the longitudinal aircraft axis X and to the flow direction S, respectively. In this case, the hinge axis 12 of the hinge joint 11 may also extend at an angle other than 90 degrees referred to the longitudinal aircraft axis X. The hinge axis 12 of the hinge joint 11 may, in particular, extend in the circumferential direction of the aircraft fuselage or perpendicular to the longitudinal aircraft axis X.

A stopping device 15 can be arranged at a location of the opening edge of the opening 9 that lies opposite of the front opening edge 9*a*, i.e., on the rear opening edge 9*b*, wherein the edge 13*b* of the cover 3 that is situated on this side of the opening 9 can be placed against said stopping device (FIGS. 5 to 9). The stopping device 15 is arranged and designed in such a way that the cover 13 is in a normal or initial position shown in FIGS. 5 and 8 when the edge section 13*b* of the cover 13 is placed against the stopping device. In this initial position, the cover 13 covers and hermetically seals the opening 9. To this end, it would be possible, in particular, to provide a sealing device that is positioned between the edge of the cover 13 and the edge of the opening 9. The sealing device may consist, in particular, of a peripheral seal. The stopping device 15 is furthermore arranged and designed in such a way that the cover 13 cannot be opened toward the outer region A and only toward the inner region IB when it is structurally installed into an aircraft fuselage with the fuselage part. The stopping device and/or the sealing device may also be provided on the relief valve with an opening and closing device in the form of a guiding device.

The cover or the relief valve 10 is in its normal position during the normal operating and in-flight mode of the aircraft, i.e., when the inventive relief valve 10 is integrated into the fuselage of this aircraft, because the inner region IB within the fuselage or a fuselage region is pressurized relative to the surroundings or the outer region AB of the fuselage.

The inventive relief valve 10 according to the aforementioned embodiments furthermore features a prestressing device that is indicated in FIGS. 5 to 9 with an arrow identified by the reference symbol "F," wherein this prestressing device is arranged in such a way that it prestresses the cover 13 into its normal or initial position (FIGS. 5 and 8), in which the cover 13 covers the opening 9 and is placed against the stopping device. The prestressing device may be realized in such a way that the prestressing force exerted thereby is adjustable. The prestressing device may feature, in particular, a spring. The relief valve 10 and, in particular, the prestressing device are constructed and designed in such a way that the relief valve opens (arrow M) when the pressure in the outer region AB of the aircraft fuselage exceeds the pressure in the inner region IB by a minimum amount. This means that the relief valve 10 fulfills a safety function, particularly in instances, in which the outside pressure increases correspondingly fast during a rapid decrease of the flight altitude of the aircraft and the inside pressure cannot be increased sufficiently fast by on-board systems of the aircraft such that a differential pressure with a higher pressure on the outside AB than on the inside IB is created.

Figure 6:
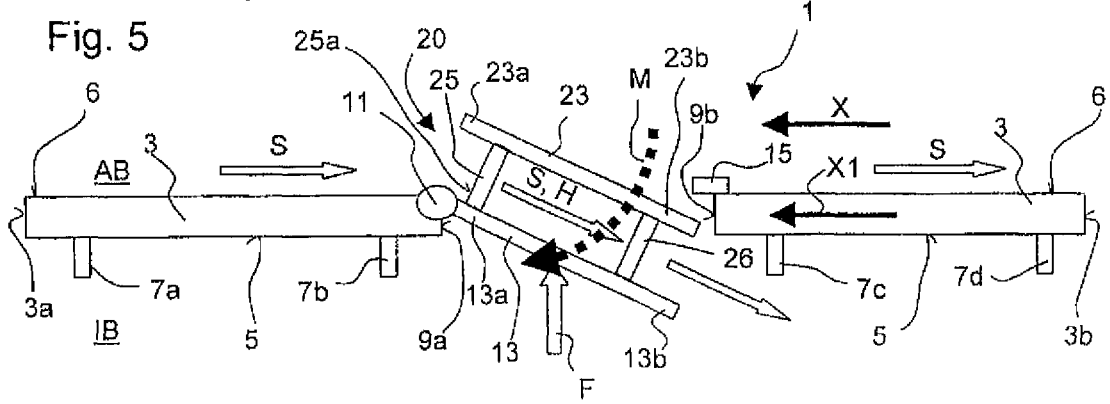
FIG. 6 shows a section of the fuselage part according to FIG. 5 with the relief valve illustrated in an opened position.
Figure 7:
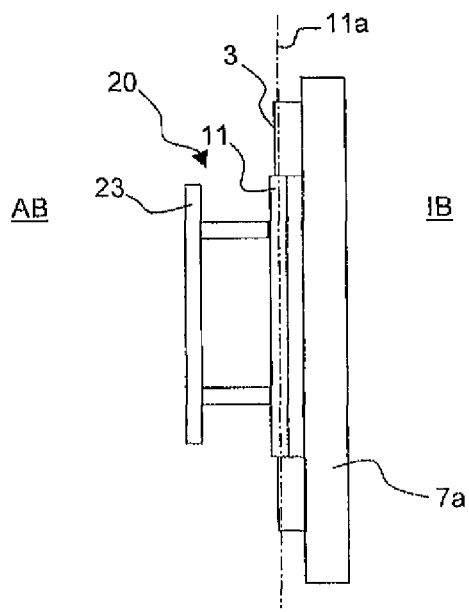
FIG. 7 shows a section of the fuselage part illustrated in FIGS. 5 and 6 viewed in the direction of the longitudinal aircraft axis, wherein the relief valve is illustrated in a closed position.

In the aforementioned embodiments, a guide plate 23 is, according to the invention, arranged on the cover 13 by means of a mounting device or a support device 20, wherein this guide plate is spaced apart from the cover 13 and extends along the cover 13. In the installed state of the relief valve 10, the guide plate 23 is situated on the outer region AB of the aircraft fuselage as shown in FIGS. 5, 6, 8, 9 and held by means of the support device 20. The support device 20 is realized permeable to the flow in the direction extending from the front cover edge 9*a* to the rear cover edge 9*b*. Due to this measure, the air flowing in the flow direction S is able to pass through the opening 9 between the guide plate 23 and the cover 13 as shown in FIGS. 6 and 9. The guide plate causes an air flow to be diverted into the inner region IB from the flow on the outside 6 of the shell part or the fuselage part, respectively, wherein the diverted flow is larger than the flow that would be diverted if no guide plate would be attached by means of the support device 20.

The position of the guide plate 23 relative to the cover 13 may be chosen differently referred to the longitudinal aircraft axis X. In one embodiment, the longitudinal direction of the guide plate 23 extends parallel to the cover 13 in the longitudinal aircraft axis X. In another embodiment, the distance between the guide plate 23 and the cover 13 is realized in such a way in the longitudinal aircraft axis X that it decreases from the front cover edge that faces the flow to the cover edge situated opposite thereof.

In the embodiment according to FIG. 5 that can be used in all variations of the inventive relief valve, the support device 20 is realized in the form of a rigid connecting structure between the cover and the guide plate 23. In order to realize the support device 20 such that it is permeable to the flow, it features openings or passages in the circumferential direction of the shell part or transverse to the flow direction and the longitudinal aircraft axis X, respectively, such that a sufficient air flow can penetrate into the region between the cover and the guide plate.

The shape of the guide plate 23 can be adapted so as to optimize the diversion of the locally occurring flow in the region of the opening 9 or the relief valve 10, i.e., the air flowing around the aircraft fuselage. The shape needs to be kinematically compatible with the intended pivoting positions of the cover 13. In one special (not-shown) embodiment, however, the rear edge 23b of the guide plate 23 may be provided as stopping device for the maximum permissible opening angle of the cover 13. In this case, the position of the rear edge 23b of the guide plate 23 is chosen such that it is placed against the rear opening edge 9b of the opening 9. Depending on the respective application, the guide plate 23 may have plane or curved surfaces so as to achieve an optimal adaptation with suitable curvatures or adjustments.

Figure 14:
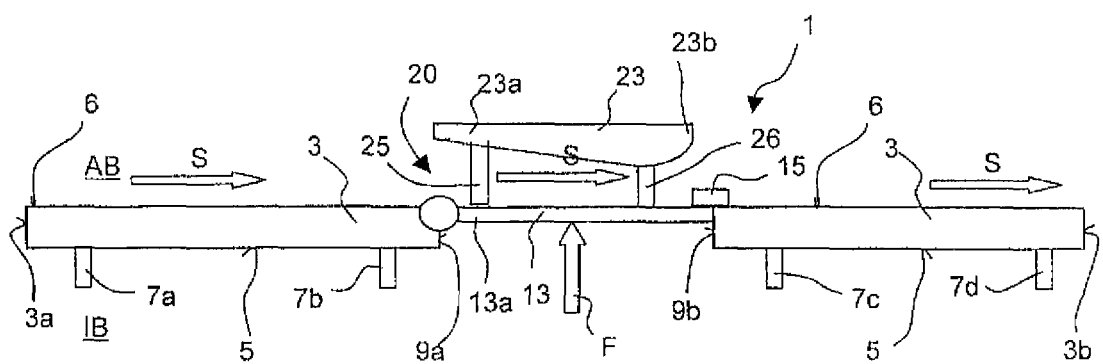
FIG. 14 shows a section of the fuselage part viewed in its circumferential direction, wherein the fuselage part features a fuselage shell with an opening and a further embodiment of the inventive relief valve arranged on the opening, wherein the relief valve is formed such that the air flowing therein causes a resulting negative pressure effecting the opening of the relief valve and wherein the relief valve is illustrated in a closed position.
Figure 15:
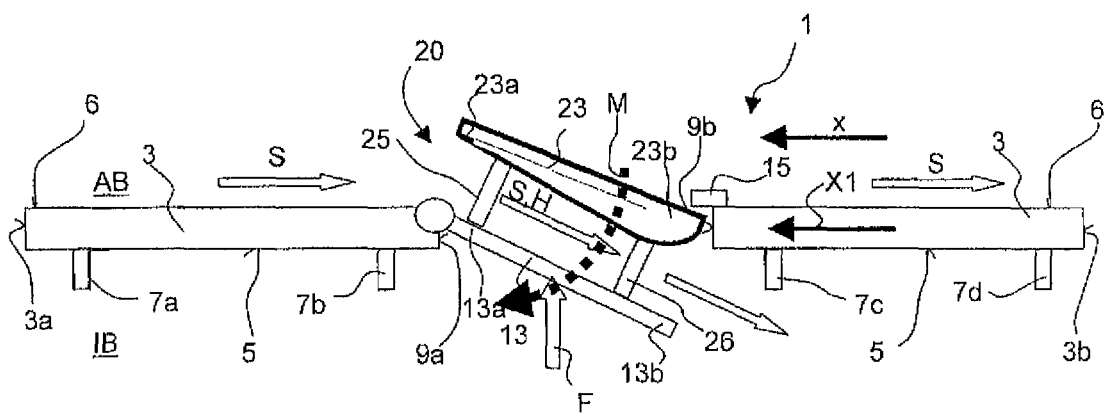
FIG. 15 shows a section of the fuselage part according to FIG. 14 with the relief valve illustrated in an opened position.

According to the example of the invention, the cover 13 and the guide plate 23 can be formed such that the distance between the cover 13 and the guide plate 23 decreases along the main direction H (FIGS. 14, 15) so that the air flowing between the cover 13 and the guide plate 23 is accelerated along the main direction H and a resulting negative pressure is generated acting in the opening direction of the cover 13. Particularly, the cross-section of the guide plate 23 running along the main direction H can have a profile form which is decreasing in a section of the guide plate 23 along the main direction H (FIGS. 14, 15).

The support device 20 may, in particular, consist of at least one (not-shown) connecting plate that extends in the longitudinal aircraft axis X between the cover 13 and the guide plate 23 so as to connect the cover 13 and the guide plate. During the operation, the air flowing around the aircraft fuselage flows along the at least one connecting plate in the closed and in the opened state of the cover 13.

In another embodiment, the support device may consist of at least one rod that extends from the cover 13 to the guide plate 23 and connects the cover 13 to the guide plate 23. In this case, the support device may consist of several (not-shown) rods that respectively connect the cover 13 to the guide plate 23 and are arranged behind one another in the direction extending from the front cover edge 13a to the rear cover edge 13b.

Figure 10:
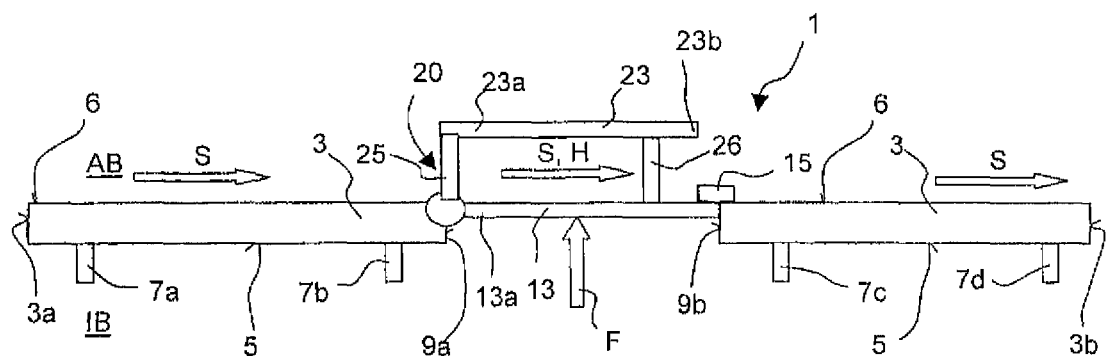
FIG. 10 shows a section of the fuselage part viewed in its circumferential direction, wherein the fuselage part features a fuselage shell with an opening and a further embodiment of the inventive relief valve arranged on the opening, wherein a font rod is disposed on a rotational part of a hinge of the cover of the valve, and wherein the relief valve is illustrated in a closed position.
Figure 11:
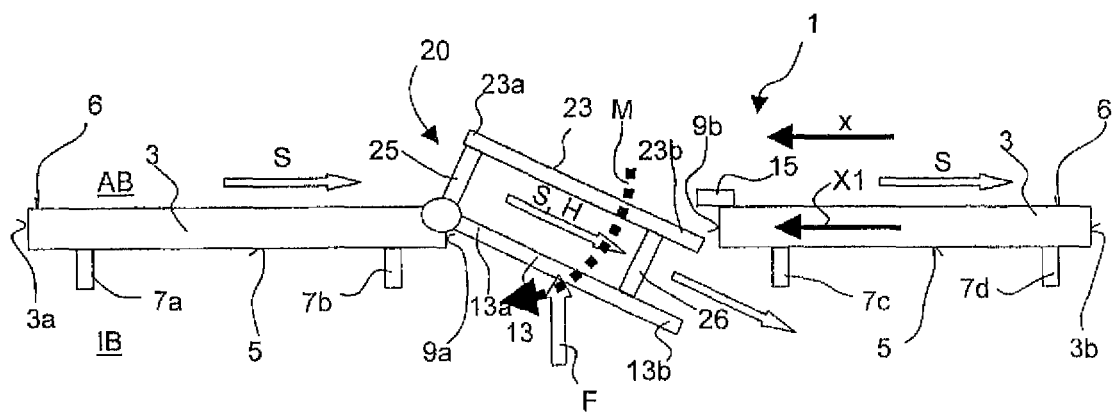
FIG. 11 shows a section of the fuselage part according to FIG. 10 with the relief valve illustrated in an opened position.
Figure 12:
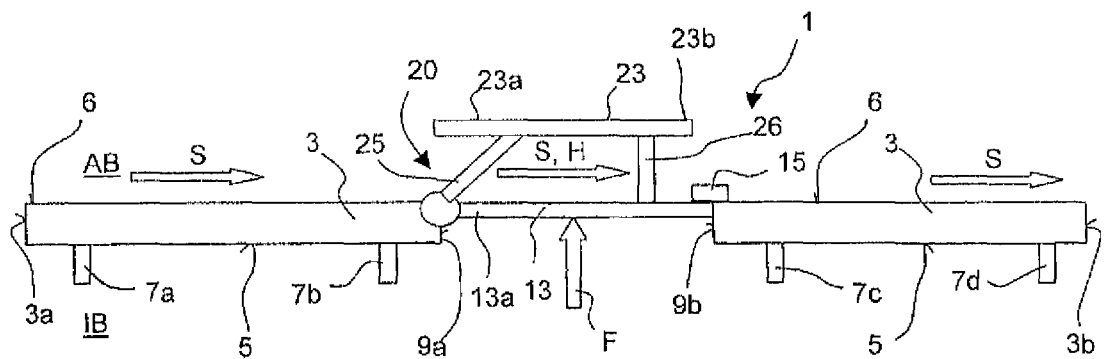
FIG. 12 shows a section of the fuselage part viewed in its circumferential direction, wherein the fuselage part features a fuselage shell with an opening and a further embodiment of the inventive relief valve arranged on the opening, wherein the front rod disposed on a rotational part of a hinge has an inclined position, and wherein the relief valve is illustrated in a closed position.
Figure 13:
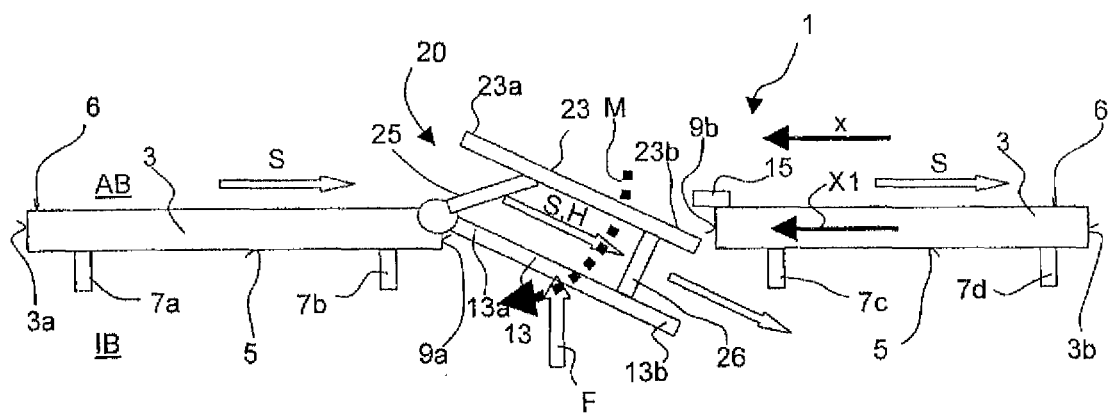
FIG. 13 shows a section of the fuselage part according to FIG. 12 with the relief valve illustrated in an opened position.

According to a further example of the invention, the support device 20 can comprise at least one front support rod 25 and at least one rear support rod 26 with regard to the main direction H. Further, the front support rod 25 can particularly be mounted on a rotating part of the hinge joint 11 (FIGS. 10 and 11).

Figure 8:
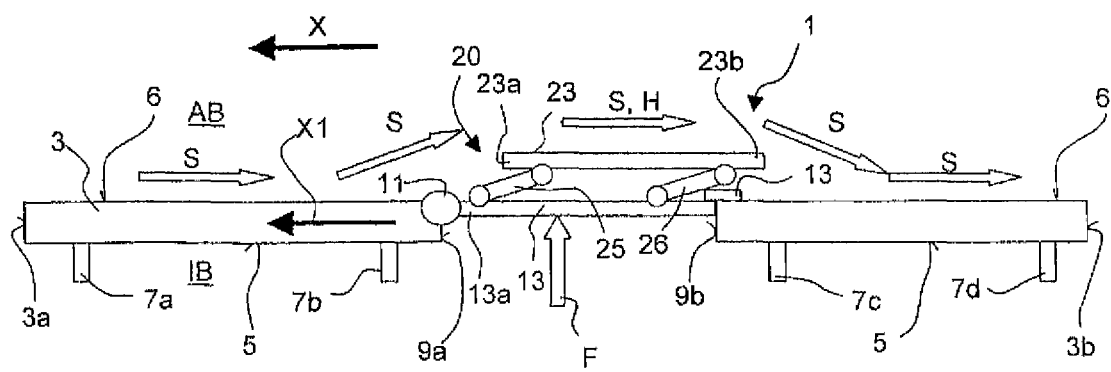
FIG. 8 shows a section of the fuselage part viewed in its circumferential direction, wherein the fuselage part features a fuselage shell with an opening and another embodiment of the inventive relief valve arranged on the opening, and wherein the relief valve is illustrated in a closed position.
Figure 9:
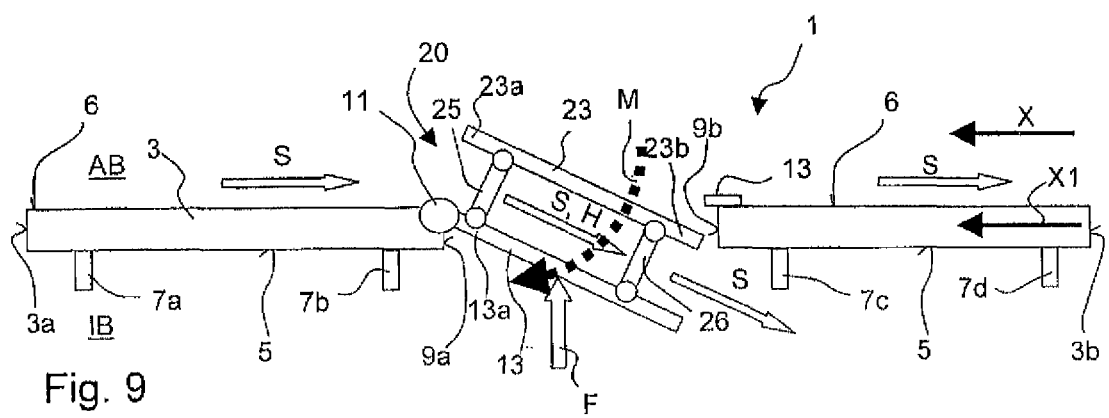
FIG. 9 shows a section of the fuselage part according to FIG. 8 with the relief valve illustrated in an opened position.

According to another embodiment that is illustrated in FIGS. 8 and 9 and can also be used in all variations of the inventive relief valve, the rods connecting the cover 13 to the guide plate 23 are coupled in an articulated fashion to the cover on their end on the cover side and to the guide plate on their end on the guide plate side such that the distance between the guide plate and the cover can be adjusted by rotating the rods. In the normal or initial position of the cover 13 of the relief valve 10, in which this cover closes the opening 9, the force exerted by the air flowing around the aircraft fuselage presses the guide plate in the flow direction S such that the distance between the cover 13 and the guide plate 23 and thereby the aerodynamic resistance is reduced. Depending on the embodiment of the relief valve 10, the guide plate 23 can be placed against the upper side of the cover 13 that faces the guide plate when the air flows against the cover 13 in its normal or initial position.

According to FIGS. 8 and 9, when the cover 13 is opening due to a negative pressure of the pressures between the pressurized fuselage and the atmosphere outside the aircraft, the force exerted by the air flowing around the aircraft fuselage in the flow direction S acts away from the guiding plate 23 from the cover 13 such that the distance between the cover 13 and the guide plate 23 is increased. This means that the surfaces of the cover 13 and the guide plate 23 that face one another form a flow channel that leads from the outer region AB to the inner region IB of an aircraft fuselage with the relief valve 10 and accordingly guides the air flowing around the aircraft fuselage from the outer region AB to the inner region IB.

In an additional development of this embodiment, the rods are prestressed into an initial position, in which the cover 13 and the guide plate 23 are spaced by a smaller or the smallest distance in comparison with the state, in which they are subjected to the flow in an opening movement of the cover (FIG. 8) and in which the aerodynamic resistance of the support device 20 and the guiding plate 23 is relatively small. In this regard, the cover 13 is designed such and the pre-stressing of the support rods 25, 26 is adjusted such that in the state in which the guide plate 23 is blown by the air S in the main direction H, during an initial opening movement of the cover 13, the cover 13 is moved in an open position while the distance between the guide plate 23 and the cover 13 increases by rotation of the support rods 25, 26. According to an example of the invention, the cover 13 and the guide plate 23 are formed such that the distance between the cover 13 and the guide plate 23 decreases along the main direction (H) when the guiding plate 23 is in an extended position so that the air flowing between the cover 13 and the guide plate 23 is accelerated along the main direction H and a resulting negative pressure is generated acting in the opening direction of the cover 13. Further, in this regard the front support rod 25 can be mounted on a rotating part of the hinge joint 11.

These embodiments can also comprise features of the before-mentioned examples of the invention. For example it can be provided that the cross-section of the guide plate 23 which is running along the main direction H has a profile form which is decreasing in a section of the guide plate 23 along the main direction H.

The aforementioned characteristics of the relief valve or the fuselage part that were described with reference to the embodiment of the opening and closing device with a hinge joint may, according to the invention, also be applied to an embodiment of the opening and closing device with a guiding device.

What is claimed is:

1. A relief valve for being arranged on an opening of a pressurized fuselage part of an aircraft, wherein the opening has a front opening edge and a rear opening edge, and wherein the relief valve features:
    a cover that is arranged on the fuselage part by means of a hinge joint in order to open and close the opening of the fuselage part, and
    a guide plate being arranged on the cover by means of a support device, wherein said guide plate is spaced apart from the cover and extends along the cover, and wherein the support device is realized permeable in a main direction extending from the cover edge with the hinge joint to the cover edge situated opposite thereof,
wherein the support device comprises at least one front support rod and at least one rear support rod with regard to the main direction, wherein each of the support rods is coupled in an articulated fashion to the cover and to the guide plate such that the distance between the guide plate and the cover can be adjusted by rotating the rods.

2. The relief valve according to claim 1, wherein the support rods are pre-stressed into an initial position, in which the cover and the guide plate have the smallest distance from one another within the adjustable distance range.

3. The relief valve according to claim 2, wherein the cover is designed such and the pre-stressing of the support rods is adjusted such that in the state in which the guide plate is blown by the air in the main direction, during an initial opening movement of the cover, the cover is moved in an open position while the distance between the guide plate and the cover increases.

4. The relief valve according to claim 1, wherein the cover and the guide plate are formed such that the distance between the cover and the guide plate decreases along the main direction so that the air flowing between the cover and the guide plate is accelerated along the main direction and a resulting negative pressure is generated acting in the opening direction of the cover.

5. The relief valve according to claim 4, wherein the cross-section of the guide plate running along the main direction has a profile form which is decreasing in a section of the guide plate along the main direction.

6. The relief valve according to claim 1, wherein the relief valve features a pre-stressing device for pre-stressing the cover into an initial position.

7. The relief valve according to claim 1, wherein the front support rod is mounted on a rotating part of the hinge joint.

* * * * *